United States Patent [19]
Reedy

[11] Patent Number: 5,150,839
[45] Date of Patent: Sep. 29, 1992

[54] NOZZLE LOAD MANAGEMENT

[75] Inventor: David V. Reedy, Cincinnati, Ohio

[73] Assignee: General Electric Company, Cincinnati, Ohio

[21] Appl. No.: 669,242

[22] Filed: Mar. 14, 1991

[51] Int. Cl.⁵ .............................................. B64C 15/02
[52] U.S. Cl. ........................ 239/265.41; 239/265.19; 239/265.35; 239/265.39
[58] Field of Search ...................... 239/265.19, 265.33, 239/265.35, 265.37, 265.39, 265.41; 60/230, 232, 271

[56] References Cited

U.S. PATENT DOCUMENTS

| | | | |
|---|---|---|---|
| 2,779,157 | 1/1957 | Palmer | 239/265.37 |
| 2,846,844 | 8/1958 | O'Rourke | 239/265.35 X |
| 2,926,491 | 3/1960 | Hyde | 239/265.41 |
| 2,974,480 | 3/1961 | Kurti | 239/265.39 X |
| 2,984,068 | 5/1961 | Eatock | 239/265.41 X |
| 3,004,385 | 10/1961 | Spears, Jr. et al. | 239/265.41 |
| 3,319,892 | 5/1967 | Zirin | 239/265.35 |
| 3,814,325 | 6/1974 | McCardle, Jr. et al. | 239/265.39 |
| 4,128,208 | 12/1978 | Ryan et al. | 239/265.39 |
| 4,176,792 | 12/1979 | McCardle | 239/265.41 |
| 4,181,260 | 1/1980 | Nash | 239/265.39 |
| 4,245,787 | 1/1981 | Freid | 239/265.41 |
| 4,440,347 | 4/1984 | Madden et al. | 239/265.39 |
| 4,447,009 | 5/1984 | Wiley et al. | 239/265.39 |
| 4,456,178 | 6/1984 | Jones et al. | 239/265.39 |
| 4,508,270 | 4/1985 | Joubert | 239/265.35 |
| 4,994,660 | 2/1991 | Hauer | 239/265.41 |
| 5,082,182 | 1/1992 | Bruchez, Jr. | 239/265.35 |

Primary Examiner—Andres Kashnikow
Assistant Examiner—William Grant
Attorney, Agent, or Firm—Jerome C. Squillaro; David L. Narciso

[57] ABSTRACT

A nozzle load transferring system is provided for transferring at least a portion of the thrust load of a gas turbine engine thrust vectoring nozzle to a relatively stationary portion of the engine using a track and track follower disposed between a stationary portion of the engine and the vectorable flaps respectively so as to transfer the thrust loads developed on the vectorable flaps to the track follower and then to the track. The preferred embodiment of the invention includes a convergent/divergent axisymmetric vectoring nozzle having a plurality of universally pivotable divergent flaps wherein the track is mounted to the engine case and has a spherical following surface with a center of curvature on the nozzle's center-line. A divergent flap actuating ring is pivotably received within the track by a plurality of track followers mounted to the actuating ring and in roller bearing relationship with the track surface. The actuating ring is operably connected to the divergent flaps so as to pivot the flaps for thrust vectoring.

9 Claims, 2 Drawing Sheets

NOZZLE LOAD MANAGEMENT

BACKGROUND OF THE INVENTION

1. Field of the Invention

This invention relates generally to vectorable nozzles and, more particularly, to thrust load paths for vectorable axisymmetric exhaust nozzles for gas turbine engines.

2. Description of Related Art

For military aircraft applications, there exists a need to increase the maneuverability of the aircraft both for air to air combat missions and complicated ground attack missions. Aircraft designers seek to replace or augment the use of conventional aerodynamic surfaces such as flaps and ailerons with vectorable nozzles which turn or vector the exhaust flow and thrust of the gas turbine engine powering the aircraft. Hauer in U.S. Pat. No. 4,994,660, herein incorporated by reference, discloses an Axisymmetric Vectoring Exhaust Nozzle (AVEN TM nozzle) that provides a means for vectoring the thrust of an axisymmetric convergent/divergent nozzle by universally pivoting the divergent flaps of the nozzle in an asymmetric fashion or in other words pivoting the divergent flaps in radial and tangential directions with respect to the unvectored nozzle centerline. Previously two dimensional nozzles have used vectored thrust means that employ relatively flat flaps to direct the pitch or yaw direction of the engine's thrust.

Vectored thrust produces both axial and radial loads that are transmitted by various load paths back to the actuators through their respective actuator shafts. The tremendous loads require heavy actuators to absorb the loads and particularly the bending moments exerted on the actuator shafts by thrust vectoring.

It is therefore one object of the present invention to provide a means to minimize or eliminate the axial and radial loads transferred by the nozzle to the actuators. It is another object of the present invention to reduce or eliminate the bending moments that the actuators would be subject to due to the radial loads. Another object is to minimize the size and weight of the nozzle actuators and hydraulic system used to power the actuators.

These objects and other features and advantages will become more readily apparent in the following description when taken in conjunction with the appended drawings.

SUMMARY OF THE INVENTION

Briefly, in accordance with one aspect of the present invention, a nozzle load transferring means is provided for transferring at least a portion, preferably all, of the vectored thrust load of a gas turbine engine thrust vectoring nozzle to a relatively stationary portion of the engine. A track and track follower are disposed between the stationary portion of the engine and the vectorable flap respectively so as to transfer the thrust loads developed on vectorable flap to the track follower and then to the track.

The preferred embodiment of the invention includes a convergent/divergent axisymmetric vectoring nozzle having a plurality of universally pivotal divergent flaps including a track having a spherical following surface mounted to the engine case and a track follower engaging the track in roller bearing relationship and operably connected to the divergent flaps so as to transfer at least a portion of the divergent flap loads to the track follower wherein the track's spherical surface has a center of curvature on the nozzle's center-line.

The preferred embodiment of the invention provides a load path means for an axisymmetric convergent/divergent vectoring nozzle that includes a means for vectoring the thrust in the pitch and yaw direction comprising a plurality of convergent and divergent flaps connected together by spherical joints. Thrust vectoring means includes the spherical joint between the primary and secondary flaps and an actuation means to pivot the secondary flaps in a coordinated manner. The actuation means includes a secondary flap actuation ring surrounding the secondary flaps and outer flaps connecting the aft end of the secondary flaps to the secondary flap actuation ring by a universal or spherical joint. The load path means provides rollers mounted on the secondary flap actuation ring that engage and follow a track means' spherical following surface connected to the engine casing.

In the drawings as hereinafter described, a preferred embodiment is depicted; however, various other modifications and alternate constructions can be made thereto without departing from the true spirit and scope of the invention.

ADVANTAGES

Among the advantages provided by the thrust vectoring nozzle load path means of the present invention is the ability of the load path means to greatly reduce the forces exerted on the nozzle actuators.

Another advantage is that the present invention requires smaller lower weight nozzle actuators that are easier to mount to the engine than would otherwise be needed.

A further advantage is that the present invention requires lower hydraulic fluid flowrates and in turn smaller hydraulic pumps and associated plumbing and valves for the thrust vectoring nozzle actuators.

BRIEF DESCRIPTION OF THE DRAWINGS

The foregoing aspects and other features of the invention are explained in the following description, taken in connection with the accompanying drawings where.

DESCRIPTION OF THE PREFERRED EMBODIMENT

Figure 1:
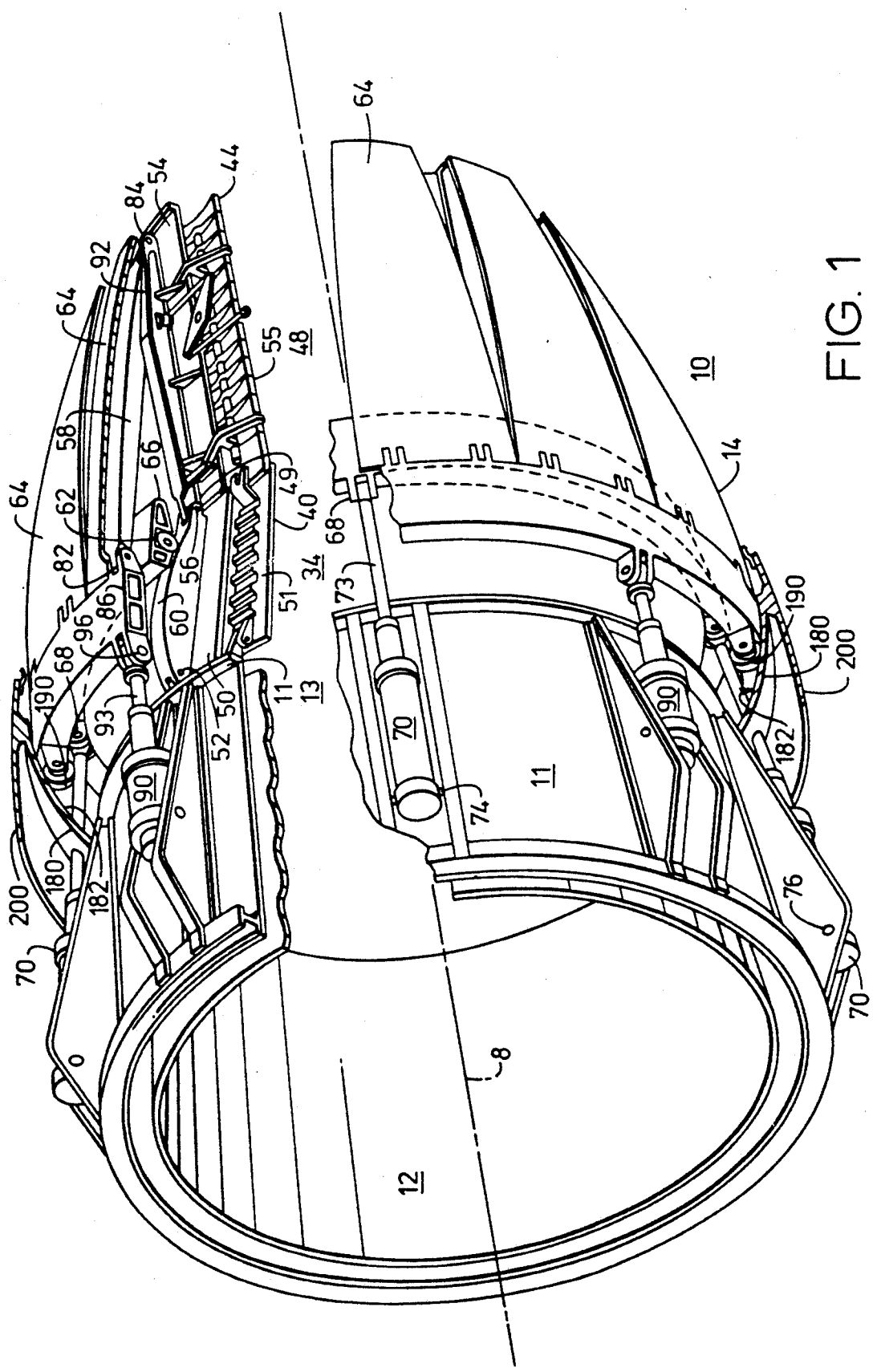
FIG. 1 is a partial cut away perspective view of a gas turbine engine axisymmetric vectoring exhaust nozzle with load path means in accordance with the present.
Figure 2:
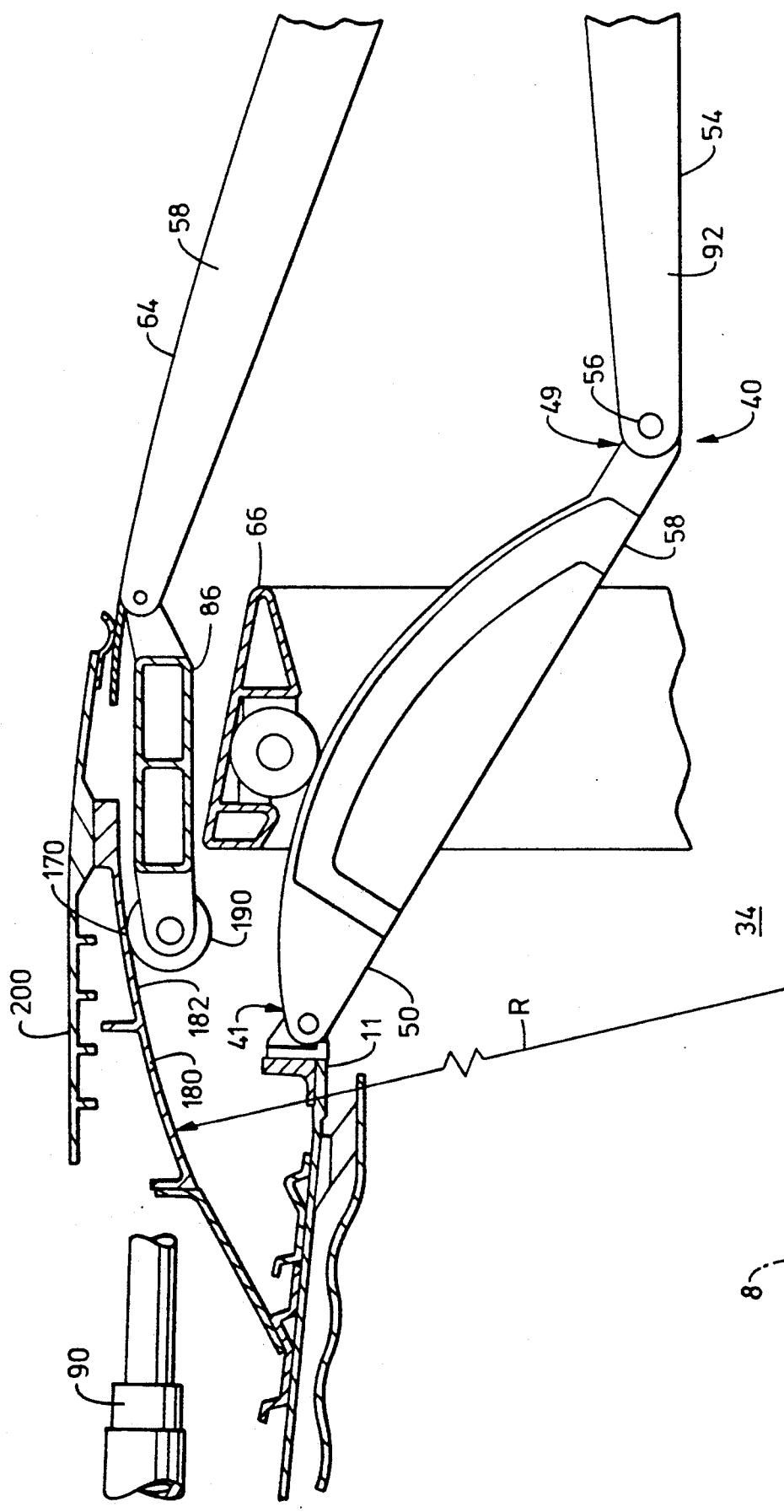
FIG. 2 is a part cross sectional and part perspective diagrammatical view of the nozzle and load path means shown in FIG. 1.

Referring now to FIGS. 1 and 2, the present invention is shown generally in the exhaust section 10 of a gas turbine engine comprising in serial flow relationship a fixed area duct or engine casing 11, including an afterburner liner 12, and a variable area downstream section 13 having an axisymmetric nozzle 14 of the convergent divergent type. Although the nozzle as shown is of the convergent/divergent type wherein the downstream section 13 includes both a convergent section and a divergent section as will be discussed hereinafter, the present invention is not intended to be limited to such a structure.

Referring now to FIG. 1, nozzle 14 comprises in serial flow relationship a convergent section 34, a throat 40 and a divergent section 48. The convergent section 34 includes a plurality of convergent or primary flaps 50 circumferentially disposed about engine centerline 8 with overlapping primary seals 51 disposed between and in sealing engagement with the radially inward facing surface of circumferentially adjacent primary flaps 50. Primary flap 50 is pivotally attached at its forward end 41 to casing 11 by first pivotal or clevis joint 52. Divergent or secondary flap 54 is pivotably attached to the aft end of primary flap 50 at its forward end 49 by a first universal or spherical joint means 56 generally at an axial position in the nozzle 14 which coincides with throat 40. Secondary flaps 54 are generally circumferentially disposed about engine centerline 8 with overlapping divergent or secondary seals 55 disposed between and in sealing engagement with the radially inward facing surface of circumferentially adjacent secondary flaps 54. Throat 40 has associated with it a throat area conventionally denoted as A8 and the nozzle exit 44 is generally at the end of secondary flaps 54 and has an exit area associated with it conventionally denoted as A9.

A plurality of rollers 62 are disposed in a primary ring structure 66 which in turn is translated forward and aft by a plurality of primary actuators 70, of which there are four in the preferred embodiment. The variable throat area A8 is controlled by the action of cam roller 62 on the cam surface 60 which is formed on the back of primary flap 50. During operation the high pressure of the exhaust gases within the nozzle force primary flaps 50 and secondary flaps 54 radially outward thus keeping cam 60 in contact with cam roller 62. Primary actuator 70 is pivotally connected to engine casing 11 by a support 76 with a pin joint 74. Primary actuator 70 has an actuator rod 73 which in turn is connected to primary ring structure 66 by a spherical joint 68.

A plurality of secondary actuators 90, of which there are three in the preferred embodiment, are mounted at different circumferential locations around case 11 than primary actuators 70 and in the same manner as actuator 70. A secondary actuation ring 86 is connected to secondary actuators 90 at the aft end of a secondary actuator rod 93 by a spherical joint 96. This provides secondary actuating ring 86 to be axially located and tilted about centerline 8 in order to control its attitude. Actuating ring 86 controls the positioning or pivoting of secondary flaps 54. Secondary flap 54 is pivotally connected to primary flap 50 by a spherical joint 56 and is pivotally controlled in a multidegree of freedom manner by a control arm 58 that is integral with outer flaps 64 and operably connects secondary actuating ring 86 to secondary flap 54. Outer flap 64 also provide a clean and smooth aerodynamic shape along the exterior of the nozzle.

Outer flaps 64 are connected to secondary ring 86 by clevis pin joints 82 and to the aft end of secondary flap 54 by a spherical joint 84. Backbone 92 provides a mount for secondary flap 54 and support for the joints at either end. Outer flaps 64 are pinned at their forward ends to secondary actuating ring 86 and at their aft ends they are universally pivoted to the aft end of secondary flap 54 thereby operable to translate an attitude change of secondary ring 86 into a multi degree of freedom pivoting change or orbital movement of secondary flap 54 whereby each secondary flap is pivoted through a different angle.

A load path means generally shown at 170 includes a three dimensional curved track 180 mounted to engine casing 11 and engaged by a track follower 190 rotatably mounted to secondary actuating ring 86. Load path means 170 provides axial and radial positioning and support of secondary actuating ring 86 as well as providing a means for transferring axial and radial thrust loads, developed by the nozzle, to engine casing 11. Curved track 180 is circumscribed by a nozzle fairing 200 that slideably engages outer flap 64 to provide smooth aerodynamic surfaces around that portion of the nozzle.

Track 180, includes a curved following surface 182 shown as spherical in shape in the preferred embodiment illustrated in FIGS. 1 and 2, can be ellipsoidal or of some other curved shape. Furthermore curved track 180, depicted as a continuous annular ring, may be segmented. The axially extending cross-sectional curve of track 180 provides the following surface 182 that acts as a cam surface for track follower 190 and therefore, to some extent, can change the effective nozzle exit area A9 as secondary actuating ring 86 is tilted to vector the thrust of the engine. A variety of curved surfaces are available to form the curved cam surface.

In operation thrust vectoring is accomplished by pivoting the divergent nozzle flaps 54 in an asymmetric fashion with respect to nozzle centerline 8. Pivoting is done in both the radial direction with respect to the centerline and in a direction tangential to a circumference about the centerline. Actuation of the pivotal divergent flaps 54 is accomplished by having the three secondary actuators 90 extend or retract out their respective rods 93 different amounts thereby tilting the secondary actuating ring 86. This action in turn causes at least two of the twelve divergent flaps to pivot in an asymmetric manner changing the axisymmetric divergent section into a asymmetric flow path. Spherically rotating the secondary actuating ring o tilting the ring such that its axis moves in a coning sort of fashion pivots the divergent section centerline in a coning motion which vectors the thrust completely or 360° about the engine centerline 8 up to some predetermined vectoring angle V. The axial and radial thrust loads are produced by the pressure of the nozzle exhaust gases acting on secondary flaps 54 which transfers the loads to outer flaps 64. The thrust loads are transferred to curved track 180 from outer flap 64 by track follower 190 which in the preferred embodiment is a roller bearing that can freely roll axially and at least to some extent circumferentially.

While the preferred embodiment of our invention has been described fully in order to explain its principles, it is understood that various modifications or alterations may be made to the preferred embodiment without departing from the scope of the invention as set forth in the appended claims.

Having thus described what is considered novel and desired to be secured by Letters Patent of the United States is I claim:

1. A nozzle flap load path means for an aircraft gas turbine engine having an engine casing and a vectoring nozzle including a plurality of vectorable nozzle flaps, said nozzle flap load path means comprising:
   a track mounted to a relatively fixed portion of the engine casing,
   a track follower engaging said track and,
   a vectoring ring connected to the vectorable nozzle flaps and pivotably connected directly to said track follower and operable to transfer thrust loads from the nozzle flaps to the engine casing.

2. A nozzle flap load path means as claimed in claim 1 wherein said track includes a following surface that is operable for said track follower to ride upon and is curved in the axial direction and is generally annular in the circumferential direction about a nozzle centerline.

3. A nozzle flap load path means as claimed in claim 2 wherein said following surface is spherical in shape.

4. A nozzle flap load path means as claimed in claim 3 wherein said track is circumferentially segmented.

5. An axisymmetric convergent/divergent thrust vectoring nozzle apparatus comprising:

in serial flow relationship and defining a flow path;
a fixed nozzle casing,
a convergent nozzle section,
a throat, and
a divergent nozzle section having a plurality of divergent flaps and a divergent flap control means for changing the flow path in said divergent nozzle section from axisymmetrical to an asymmetrical including a means for universally pivoting said divergent flaps,
an actuating ring spaced radially outward of the throat operably connected to said divergent flaps so as to universally pivot said divergent flaps about respective points on said nozzle casing,
a track means having said actuating ring universally pivotably mounted radially within and mounted to a relatively fixed portion of said nozzle casing,
a track follower engaging said track means and mounted to said actuating ring wherein said track follower is operable to transfer thrust loads from said plurality of nozzle flaps to said nozzle casing.

6. An axisymmetric convergent/divergent thrust vectoring nozzle apparatus as claimed in claim 5 wherein said track includes a following surface that is operable for said track follower to ride upon and is curved in the axial direction and is generally annular in the circumferential direction about a nozzle centerline.

7. An axisymmetric convergent/divergent thrust vectoring nozzle apparatus as claimed in claim 6 wherein said following surface is spherical in shape.

8. An axisymmetric convergent/divergent thrust vectoring nozzle apparatus as claimed in claim 7 wherein said track means is circumferentially segmented.

9. An axisymmetric convergent/divergent thrust vectoring nozzle apparatus as claimed in claim 7 wherein said actuating ring is operably connected to said divergent flaps by a plurality of outer flaps.

* * * * *